US010003097B2

(12) United States Patent
Trudeau, Jr. et al.

(10) Patent No.: US 10,003,097 B2
(45) Date of Patent: Jun. 19, 2018

(54) PROCESS FOR OPERATING A REDOX FLOW BATTERY SYSTEM

(71) Applicant: Zinc Air Incorporated, Columbia Falls, MT (US)

(72) Inventors: Paul Abel Trudeau, Jr., Whitefish, MT (US); Ronald David Brost, Whitefish, MT (US)

(73) Assignee: VIZN ENERGY SYSTEMS, INCORPORATED, Columbia Falls, MT (US)

( * ) Notice: Subject to any disclaimer, the term of this patent is extended or adjusted under 35 U.S.C. 154(b) by 485 days.

(21) Appl. No.: 14/623,955

(22) Filed: Feb. 17, 2015

(65) Prior Publication Data
US 2015/0162633 A1 Jun. 11, 2015

Related U.S. Application Data

(62) Division of application No. 13/196,400, filed on Aug. 2, 2011.

(51) Int. Cl.
*H01M 2/38* (2006.01)
*H01M 8/20* (2006.01)
*H01M 8/18* (2006.01)

(52) U.S. Cl.
CPC ............ *H01M 8/20* (2013.01); *H01M 8/188* (2013.01); *Y02E 60/528* (2013.01)

(58) Field of Classification Search
CPC ...... H01M 8/18; H01M 8/188; H01M 8/0693; H01M 8/20; H01M 12/08; H01M 2300/0002; H01M 2300/0017; Y02E 60/528
See application file for complete search history.

(56) References Cited

U.S. PATENT DOCUMENTS

| 4,180,623 | A | 12/1979 | Adams |
| 4,609,596 | A | 9/1986 | Hitchcock et al. |
| 4,786,567 | A | 11/1988 | Skyllas-Kazocos et al. |

(Continued)

FOREIGN PATENT DOCUMENTS

| DE | 10-2009-009357 | * | 9/2010 | .............. H01M 8/18 |
| JP | 2004207177 A | | 7/2004 | |

OTHER PUBLICATIONS

Adams, G.B. et al., Rechargeable Alkaline Zinc/Ferricyanide Battery, Final Report Sep. 29, 1978-Sep. 28, 1979, 195 pgs., U.S. Department of Energy, Division of Energy Storage Systems, Lockheed Palo Alto Research Laboratory, Palo Alto, CA, 1979.

(Continued)

*Primary Examiner* — Raymond Alejandro
(74) *Attorney, Agent, or Firm* — Brooks Kushman P.C.

(57) ABSTRACT

A redox flow battery system including a reactive cell with an anode chamber separated from a cathode chamber separated by an ion-permeable membrane is provided. A catholyte reservoir is connected to the cathode chamber by a catholyte fluid circulation circuit. An anolyte reservoir is connected to the anolyte chamber by an anolyte fluid circulation circuit. Nitrogen sparging of reactive oxygen from the catholyte fluid in the catholyte reservoir prevents the formation of a finely divided solid precipitate in the catholyte fluid. Nitrogen may be provided from an external source of nitrogen. Nitrogen may also be provided by the in situ generation of nitrogen from air.

5 Claims, 2 Drawing Sheets

(56) References Cited

U.S. PATENT DOCUMENTS

| | | | |
|---|---|---|---|
| 5,316,643 | A | 5/1994 | Ahn et al. |
| 5,445,856 | A | 8/1995 | Chaloner-Gill |
| 6,722,933 | B2 | 4/2004 | Hunter |
| 7,517,608 | B2 | 4/2009 | Brereton et al. |
| 8,013,470 | B2 | 9/2011 | Votoupal et al. |
| 2007/0246374 | A1 | 10/2007 | Eisman et al. |
| 2011/0244277 | A1 | 10/2011 | Gordon, II et al. |
| 2012/0052347 | A1 | 3/2012 | Wilson et al. |
| 2012/0115069 | A1 | 5/2012 | Noack et al. |

OTHER PUBLICATIONS

Adams, G.B. et al., Rechargeable Alkaline Zinc/Ferricyanide Battery, Final Report Apr. 1, 1980-Jun. 1, 1981, 160 pgs., U.S. Department of Energy, Division of Energy Storage Systems, Lockheed Palo Alto Research Laboratory, Palo Alto, CA, 1981.

Trant, C. et al., Solubility of Sodium Ferrocyanide and Potassium Ferrocyanide in Solutions of NaOH and KOH Mixtures at 25° C, Xerox Undergraduate Research Fellows Program, 1 pg., www.rochester.edu/college/kearnscenter/pdf/xerox_pdf's_2011/Trant_and_Vercillo_poster.pdf, Jul. 28, 2011.

\* cited by examiner

PROCESS FOR OPERATING A REDOX FLOW BATTERY SYSTEM

CROSS-REFERENCE TO RELATED APPLICATION

This application is a division of U.S. application Ser. No. 13/196,400 filed Aug. 2, 2011, the disclosure of which is hereby incorporated in its entirety by reference herein.

TECHNICAL FIELD

This disclosure relates to redox flow battery systems.

BACKGROUND

A typical electrochemical cell may include a cathode side and an anode side separated by a separator arrangement. In the redox flow battery art the cathode is the positive side, and the anode is the negative side. The positive cathode side may include a cathode current collector, a cathode electroactive material (reduced on discharge) and an electrolyte. The negative anode side may include an anode current collector, an anode electroactive material (oxidized on discharge) and an electrolyte. The cell separator separating the cathode and anode sides, inter alia, permits ionic flow therebetween. The current collectors, electroactive materials, electrolytes and cell separator thus form an electrochemical cell that converts chemical energy to electricity. Hence, the current collectors may be (externally) electrically connected together to form an electrical circuit.

In redox flow battery systems the electrodes are generally solid inert materials, and the electrolytes are flowing liquids that contain the electroactive materials. The electrolytes may be aqueous or non-aqueous solutions. The electrodes serve as sites where electrochemical reactions take place. The positive liquid is known as the catholyte, and the negative liquid is known as the anolyte.

The respective electrolytes are generally circulated through the respective sides of the cell by way of fluid circulation systems that are external to the cell. According to certain embodiments, each of the external catholyte and anolyte circulation systems includes an electrolyte reservoir. Some embodiments have an external circulation system on only one side of the cell. Several cells may share the same set of reservoirs, if desired. Systems in which only one of the electrolytes is circulated externally of the cell are generally described as partial redox flow battery systems.

Charging and discharging of the electrolytes generally take place in the reactive cell. The electrolytes are stored in their respective reservoirs outside of the cell. If desired, charging may be accomplished by replenishing the spent electrolytes in the respective reservoirs with fresh electrolytes.

The power output of the cell is generally determined by its physical size, and the capacity of the cell is determined by the size of the external electrolyte reservoirs.

Certain redox flow battery systems experience the formation of undesired precipitates in the catholyte. Such undesired precipitates form particularly during the charging phase in certain secondary redox flow battery systems. Numerous chemical reactions take place on both the cathode side and anode side of an electrochemical cell during the normal operation of a redox flow battery system. Many of these chemical reactions involve the reactants, or are catalyzed by trace elements in the respective electrolytes. Many of the reactants and reaction products are transitory, and do not significantly influence the performance of the system. Where a solid precipitate is formed that is of such a nature that it impairs the operation of the system, it is a problem that needs to be solved.

SUMMARY

In certain prior redox flow battery systems an undesired precipitate formed in the catholyte fluid (positive electrolyte), particularly during the recharging phase of the operation of secondary redox flow batteries. This undesired precipitate was a very fine solid, typically with an average sub-micron particle size. The solid insoluble precipitate was of such a size and hardness that it exhibited abrasive properties. With a sub-micron average particle size, it acted as a polishing agent for glass or metals. Because of its physical characteristics, the hard, solid, sub-micron sized material damaged and impaired the pumps, valves, and flow controls in redox flow battery systems. This undesired material also tended to coat the cathode and the separator resulting in higher electrical resistance. The mechanisms of this precipitate's formation, and the reactants involved, were not fully understood. The undesired precipitates were often metal oxides that were insoluble in the electrolyte in which they occurred. The oxygen that reacted to form the undesired metal oxides was generally believed to result from the breakdown of water in the electrolytes, probably catalyzed by some trace element in the electrolyte. Oxygen from the air was also believed to contribute oxygen to the electrolytes where the systems were not hermetically sealed. Considerable unsuccessful effort was exerted towards attempting to identify and eliminate possible catalysts for the supposed breakdown of water.

Surprisingly, it has been found that just excluding dissolved reactive oxygen from the catholyte fluid is possible, and substantially prevents the formation of finely divided undesired solid precipitates in the catholyte fluid, particularly finely divided solid precipitates. It has been found that if any oxygen that is generated in the catholyte chamber is removed from the catholyte fluid as it is formed, the formation of undesired precipitates is substantially prevented.

The formation of an undesired precipitate is prevented by substantially continuously preventing reactive oxygen in the catholyte fluid from forming solid precipitate with a finely divided form. According to certain embodiments, this is accomplished by carrying out at least one of the steps of physically removing substantially all of the reactive oxygen as it forms from the catholyte fluid, or chemically removing substantially all of the reactive oxygen as it forms from the catholyte fluid, or substantially inhibiting the formation of a solid precipitate in finely divided form.

Certain embodiments include the introduction of nitrogen gas from an external source to remove reactive oxygen from the catholyte fluid. Certain further embodiments generate substantially oxygen free nitrogen gas in situ within the redox flow battery system. This nitrogen is generated by removing the oxygen from air. The resulting oxygen depleted air consists almost entirely of nitrogen. The substantially oxygen free nitrogen which is so generated is then used to remove reactive oxygen from the catholyte fluid.

While not wishing to be bound by any theory, it is believed that Redox flow battery systems based on zinc-iron chemistry generate an undesired solid precipitate in the catholyte fluid at least in part via the following reaction:

$$Na_xFe(CN)_6 + O_2 \rightarrow Fe_nO_m\downarrow$$

The reactive removal of oxygen from the ambient air results in the consumption of the anode. Approximately 1 milliliter of oxygen is absorbed per gram of zinc per minute. It is similarly believed, but without wishing to be bound by any theory, that the oxygen scavenging reaction with the anode proceeds as follows where the anode comprises zinc:

$$Zn + \tfrac{1}{2}O_2 \rightarrow ZnO$$

The zinc anode is reformed via an electrochemical reaction that occurs after the oxygen has substantially all been removed from the ambient air. It is similarly believed, but without wishing to be bound by any theory that the oxygen scavenger recovery reaction is as follows:

$$Ni|OH^-,O_2\|ZnO,OH^-|Zn$$

$$ZnO + H_2O + 2e^- \rightarrow Zn + 2OH^-$$

$$2OH^- \rightarrow \tfrac{1}{2}O_2 + H_2O + 2e^-$$

Certain embodiments of redox flow secondary battery systems are operated by selecting a reaction cell that reactively confines an anolyte fluid in an anolyte chamber and a catholyte fluid in a catholyte chamber. The chambers are separated by a cell separator. The catholyte fluid includes at least one element that forms a finely divided solid precipitate in the presence of reactive oxygen. A catholyte reservoir is provided in fluid transfer communication with the catholyte chamber through a catholyte fluid circulation circuit. Reactive oxygen in the catholyte fluid is substantially prevented from forming finely divided solid precipitate.

According to certain further embodiments, an anolyte reservoir is provided in fluid transfer communication with the anolyte chamber through an anolyte fluid circulation circuit. Ambient air containing ambient nitrogen and ambient oxygen is introduced from outside of the redox flow battery system into the anolyte fluid. The ambient oxygen is removed from the anolyte fluid in the anolyte chamber to form oxygen depleted air. In a redox flow secondary battery system having a zinc-iron redox chemistry the undesired finely divided solid precipitate comprises iron oxide, and ambient oxygen is removed by reaction with zinc metal at the anode. The resulting oxygen depleted air is brought into contact with the catholyte fluid either in the headspace in the catholyte or sparged into the catholyte fluid, and allowed to purge the reactive oxygen from the catholyte fluid.

In certain alternative embodiments, reactive oxygen is prevented from forming a fine precipitate by providing an oxygen scavenger on the catholyte side of the system in scavenging contact with reactive oxygen, where the oxygen scavenger reacts with reactive oxygen to form a solid with a massive form. Such oxygen scavengers include finely divided or reticulated common metals such as, for example, iron, magnesium, lead, tin, or aluminum, or reticulated carbon or nano-sized carbon particles. Individual scavenger particles are either enclosed or confined so they cannot circulate freely in the catholyte, or are large enough in a massive form that they do not circulate through the catholyte fluid circuit. The massive form in certain embodiments may be a single monolithic body or large granules with at least one dimension being on average a sixteenth of an inch or more in length. For example, iron sponge chips or granules with an average size of approximately one-quarter inch placed in the headspace of a catholyte reservoir scavenge some reactive oxygen from the catholyte fluid circulation circuit.

According to certain embodiments it has been particularly effective to employ both chemical scavenging in the catholyte reservoir headspace and sparging of the catholyte with nitrogen in the catholyte reservoir. Chemical scavenging depends on a chemical reaction to accomplish the removal of reactive oxygen from the catholyte. The rate of that reaction must be such that reactive oxygen is removed before it can form an undesired precipitate in the catholyte. Where the available oxygen scavengers do not react quickly enough in a particular system, additional reactive oxygen removal steps should be employed in conjunction with or in place of a chemical scavenging reaction. According to certain embodiments, rapid and substantially complete removal of the reactive oxygen from the catholyte provides the most optimum operating conditions. The removal rate of reactive oxygen should be such as to maintain the reactive oxygen level below approximately 10,000 parts per million in the catholyte.

Both sparging and scavenging may be employed in certain embodiments. For example, reactive oxygen may be sparged from the catholyte fluid by, for example, nitrogen, argon, other noble gases, or other gases that are substantially inert in the particular system in which they are to be employed, and reactive oxygen may scavenged be concurrently scavenged by, for example, one-eighth inch iron sponge granules located in the headspace of the catholyte reservoir.

Maintaining an effective oxygen excluding blanket of a gas above the upper surface of the catholyte fluid in the catholyte reservoir in certain embodimets substantially prevents the formation of undesired finely divided solid precipitate in the catholyte fluid. The blanket is generally maintained at a slight over-pressure (at least approximately 100 millibars over ambient pressure) to prevent ambient oxygen from the atmosphere outside of the system from entering the headspace.

Providing a radical scavenger in the catholyte fluid that substantially inhibits the formation of the undesired solid precipitate is effective in preventing the formation of undesired finely divided solid precipitate in the catholyte fluid. Suitable radical scavengers include, for example, benzyl acetone, hydrazine, and ascorbic acid in the electrolyte mix.

Certain embodiments of the redox flow secondary battery include a port for introducing air from outside of the battery is provided. The introduced air contains ambient nitrogen and ambient oxygen. The structure conveys the introduced air into the anolyte fluid. The anolyte chamber contains elements that are adapted to removing the ambient oxygen from the anolyte fluid to produce oxygen depleted air. A conduit is provided to bring at least a portion of the resulting oxygen depleted air into contact with the catholyte fluid.

BRIEF DESCRIPTION OF THE DRAWINGS

The present invention provides its benefits across a broad spectrum of redox flow battery systems with different chemistries. While the description which follows hereinafter is meant to be representative of a number of such redox flow battery systems, it is not exhaustive. As those skilled in the art will recognize, the basic method and apparatus taught herein can be readily adapted to many redox flow battery systems. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation.

DETAILED DESCRIPTION

Figure 1:
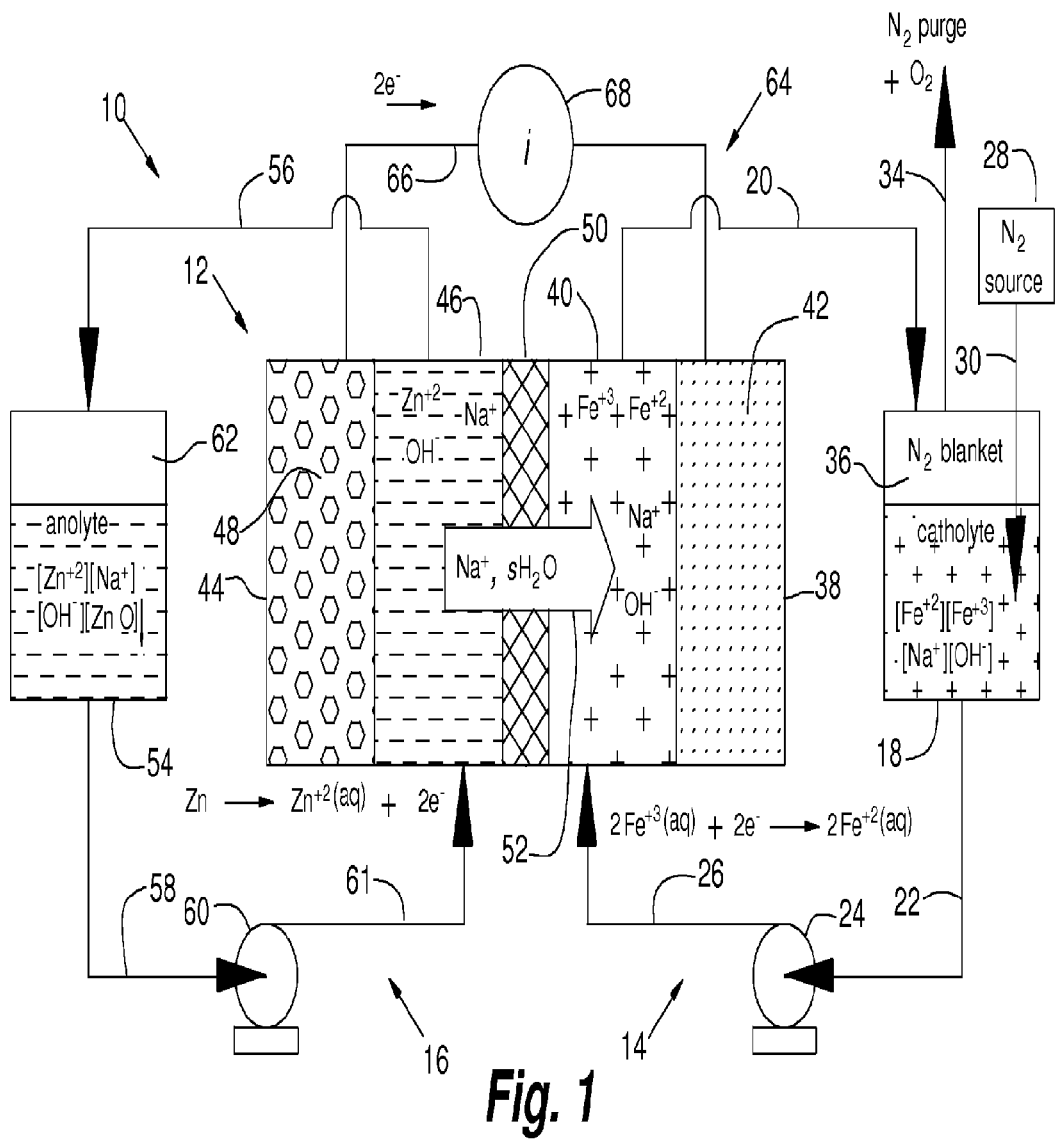
FIG. 1 is a diagrammatic representation of a redox flow battery system including a reaction cell, an external electrical circuit, an anolyte reservoir in fluid communication with the cell through an anolyte fluid circulation circuit, and a catholyte reservoir in fluid communication with the cell through a catholyte circulation circuit.

Referring to the drawings for purposes of illustrating certain selected embodiments, and not limitation, there is indicate generally at 10 a redox flow battery system. Redox flow battery system 10 includes a reaction cell indicated generally at 12, a catholyte fluid circulation circuit 14, an anolyte fluid circulation circuit 16, and an external electrical circuit indicated generally at 64.

Figure 2:
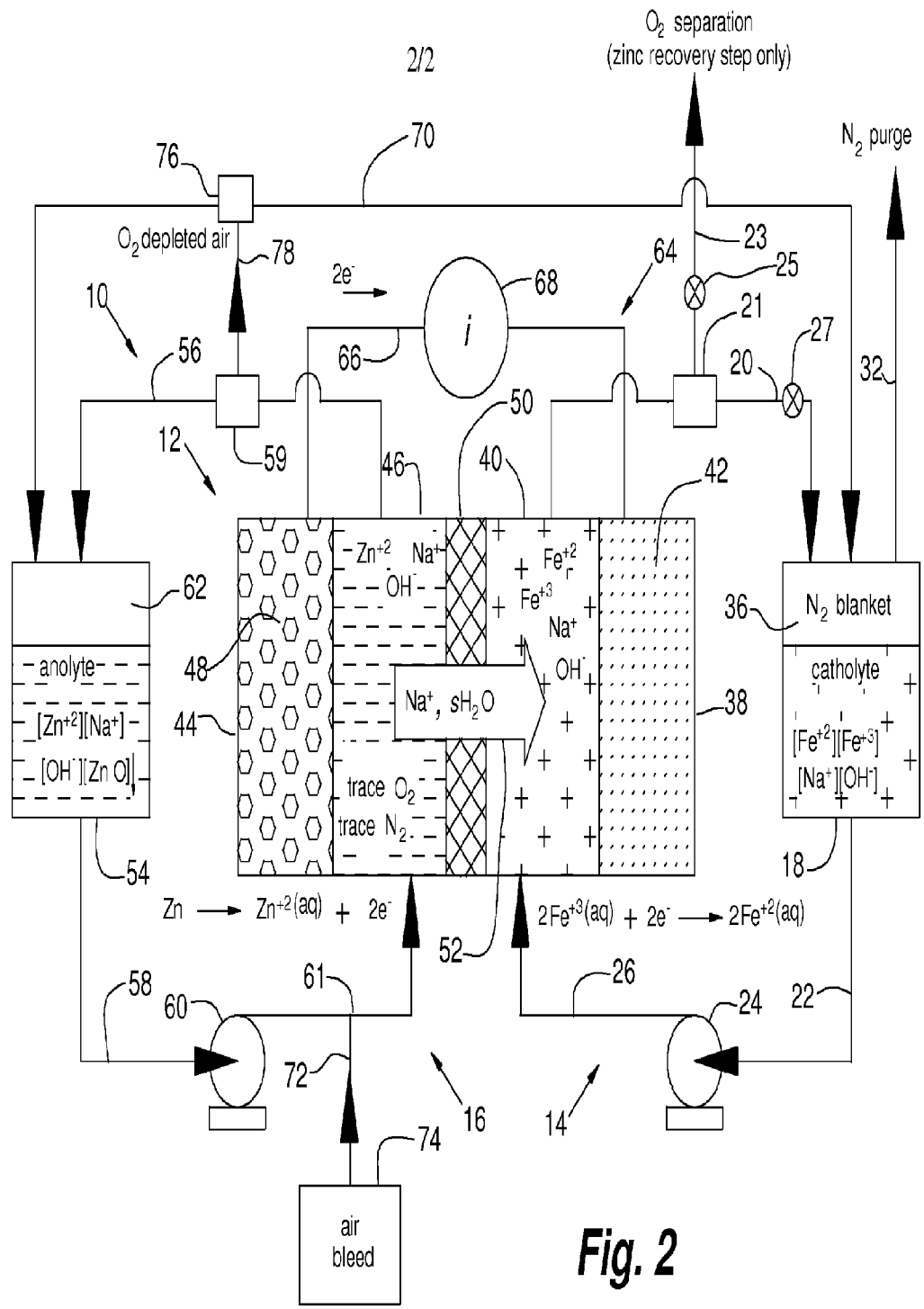
FIG. 2 is a diagrammatic representation of the redox flow battery system of FIG. 1 including an in situ nitrogen generation circuit wherein ambient air is injected into the anolyte fluid, and ambient nitrogen is separated from ambient oxygen in the anolyte chamber. The resulting ambient nitrogen is used to purge oxygen from the catholyte fluid. The substantially oxygen free nitrogen that is generated on the anolyte side of the system is used to purge reactive oxygen from the catholyte side of the redox flow battery system. Zinc that is consumed at the anode during the removal of oxygen from the air is subsequently regenerated by an electrochemical reaction.

Reaction cell 12 includes an anode side 44, and a cathode side 38. In the embodiment chosen for illustration, anode 48 comprises zinc plated on cadmium, cathode 42 comprises nickel foam, and the chemistry is zinc-iron with FeII and FeIII in a strong base. The reactive ions are as indicated in FIGS. 1 and 2. Cell separator 50 is a conventional ion permeable membrane. The movement of ions across cell separator 50 is indicated at 52. In certain embodiments catholyte chamber 40 and anolyte chamber 46 are operated in the fully flooded condition. Some further embodiments employ a headspace in one or both cell sides over the level of the upper surfaces of the electrolyte fluids.

Catholyte fluid circulation circuit 14, in the embodiment selected for purposes of illustration comprises an external loop (external to reaction cell 12) around which catholyte fluid is circulated to and from catholyte chamber 40. This loop includes a catholyte chamber 18, a catholyte return overflow line 20 from catholyte chamber 40 to catholyte reservoir 18, a catholyte fluid circulation conduit 22 from catholyte reservoir 18 to catholyte fluid pump 24, and catholyte fluid circulation conduit 26 from catholyte fluid pump 24 to catholyte chamber 40 of reactive cell 12. Catholyte reservoir 18 holds catholyte fluid that is excess to the catholyte fluid that is in catholyte chamber 40 at any given moment. Catholyte fluid pump 24 pumps catholyte fluid from catholyte reservoir 18 into catholyte chamber 40. The hydraulic pressure exerted by catholyte fluid pump 24 also forces catholyte fluid from catholyte chamber 40 to catholyte reservoir 18 through catholyte return overflow line 20.

Headspace 36 above the upper surface of the liquid catholyte in catholyte reservoir 18 serves to hold a nitrogen blanket. This nitrogen blanket prevents oxygen from reaching and dissolving in the catholyte fluid in catholyte reservoir 18. Nitrogen source 28 (FIG. 1 only) is, according to certain embodiments, a conventional pressurized tank of nitrogen. In further embodiments, sparging of dissolved oxygen from the catholyte fluid in catholyte reservoir 18 is accomplished by injecting nitrogen from nitrogen source 28 through nitrogen feed line 30 at a location below the upper surface of the catholyte fluid in catholyte reservoir 18. This injected nitrogen accumulates in headspace 36, and is vented from headspace 36 through gas purge line 34. The oxygen that is removed from the catholyte fluid and that enters headspace 36 is also removed through gas phase purge line 34. Gas phase purge line 34 is throttled so that the pressure in headspace 36 is greater than ambient. This serves to prevent air from flowing back into headspace 36 through gas purge line 34.

Anolyte fluid circulation circuit 16, in the embodiments chosen for purposes of illustration, is very similar to catholyte fluid circulation system 14. Anolyte fluid pump 60 serves to drive the anolyte fluid around an external loop that includes anolyte return overflow line 56, anolyte reservoir 54, anolyte fluid circulation conduit 58, and anolyte fluid circulation conduit 61. The direction of the anolyte fluid flow around this external loop (external to anolyte chamber 46) is as indicated by the arrows in FIGS. 1 and 2.

For the sake of simplicity in illustrating the embodiment of FIG. 1, no pressure balancing tubes are shown. In certain closed or hermetic embodiments pressure is balanced across reactive cell 12 by means of a balancing tube extending, for example, between the respective electrolyte containing reservoirs 18 and 54. This is similar to what is shown at 70 in FIG. 2. In many embodiments, headspace 62 in anolyte reservoir 54 is not provided with a nitrogen blanket unless there is a pressure balancing tube extending between headspaces 36 and 62, although such a nitrogen blanket may be provided, if desired. In those embodiments with a pressure balancing tube between the two sides of the reactive cell 12, the composition of the gaseous blanket in headspace 62 is approximately the same as that in headspace 36.

According to the embodiments chosen for illustration in FIGS. 1 and 2, the reactive oxygen that is responsible for the formation of the undesired precipitate is removed from the catholyte fluid by purging the catholyte fluid with nitrogen before the precipitate is formed. The nitrogen gas is preferably sparged into the catholyte fluid to ensure efficient dissolution and displacement of oxygen that may reside in the solution. If desired, nitrogen may be introduced to the catholyte fluid just by injecting it into the headspace in the catholyte reservoir. This is generally not as efficient as sparging. For the sake of convenience, many embodiments carry out the sparging operation in the catholyte reservoir, but this sparging may be carried out where ever the catholyte fluid is present, and the physical configuration of the system permits.

The rate of nitrogen injection into the catholyte fluid may be constant or delivered as a function of the temperature, charge voltage, or design of the system (hermetic designs will require less nitrogen). More oxygen tends to evolve in the catholyte fluid at higher temperatures and higher charge voltages. The minimum injection rate that will accomplish substantially complete removal of all reactive oxygen from the catholyte fluid may vary with varying operating parameters, and system design.

According to certain embodiments, other gasses besides nitrogen may be used to sparge oxygen from catholyte fluid. Such gases include, for example, argon and other gases that are inert in the environment of the particular system that is involved. For example, methane and carbon dioxide may be used in environments in which they are substantially inert. Nitrogen is generally readily available, safe to handle, effective in sparging oxygen, inert under the conditions typically encountered in catholyte fluid, and inexpensive. According to some embodiments, substantially oxygen free nitrogen can be generated in situ. Generally, any gas that is non-reactive under the conditions encountered in the redox flow battery system in which it is to be used may be employed.

According to certain further embodiments, sparging operations may be used to remove gases other than oxygen from the electrolytes. Some redox flow battery systems generate trace gases in the electrolytes that should be removed to maintain the best operating conditions within the system. Some organic materials of construction emit trace amounts of gas over time. Some reactants that are normally added to the electrolytes contain trace impurities that evolve gases over time through trace side reactions. Gases such as, for example, carbon dioxide, carbon monoxide, ammonium, and volatile organics may be removed by performing sparging operations on the electrolyte that contains them.

The minimum rate at which nitrogen is introduced into the catholyte fluid is determined by the rate at which reactive oxygen occurs in the catholyte fluid. A considerable excess of nitrogen is provided either batch wise as needed, or continuously. According to certain embodiments the nitrogen flowrate is a minimum of 1,000 times the calculated oxygen evolution rate. The oxygen evolution rate is calculated based on the experimentally determined coulombic efficiency of the cell. An alternative to this metering process is to allow a large over-injection of nitrogen regardless of the run condition of the reactive cell. The necessary flow rate may be determined empirically by starting with no nitrogen purge and increasing the flowrate of nitrogen until a flowrate is reached at which no undesired precipitate is observed after continuously operating the reactive cell for at least 4 days. The flowrate of nitrogen may also vary depending on where in the full discharge-charge cycle the operation is at any given moment. If more oxygen evolves in the catholyte fluid at a particular point in the operation cycle of a reactive cell, additional nitrogen may be used at that point, if desired.

External electrical circuit 64, in the embodiment chosen for illustration, comprises an electrically conductive line 66 that extends between and in electrically conductive contact with anode 48 and cathode 42, and includes device 68. Device 68 may be either an electrical load or a source of charging current.

An in situ nitrogen generation circuit is illustrated in FIG. 2. Embodiments that provide for the in situ generation of nitrogen provide for the injection of air into the anolyte fluid circulation circuit so that ambient air containing both ambient oxygen and ambient nitrogen contacts the anode in a reactive cell. In the illustrative embodiment, the ambient oxygen is removed from the injected air by reaction with metallic zinc in the anode. The oxygen depleted gas phase that leaves the anolyte chamber 46 is mostly ambient nitrogen with traces of other gases such as argon and helium. The metallic zinc component of the anode in the illustrated embodiment forms zinc oxide in this ambient oxygen removal reaction, and must be regenerated to maintain the efficiency of the reactive cell 12. The sub-system that provides for the in situ generation of nitrogen thus involves both the removal of ambient oxygen and the regeneration of zinc.

In the in situ nitrogen generation embodiment chosen for purposes of illustration, an ambient air bleed control 74 gathers ambient air containing ambient oxygen and ambient nitrogen and injects this ambient air into anolyte fluid circulation conduit 61 through ambient air injection line 72. When the ambient air in the anolyte fluid contacts anode 48 in catholyte chamber 46, the reaction of oxygen from the injected air with the plated zinc metal on anode 48 is spontaneous and results in the formation of zinc oxide/zincate. This is solubilized and forced out of the anolyte chamber 46 through the incumbent flow mechanism into the anolyte reservoir 54, where it is stored.

The rate of air injection is usually minimized since the oxidation of the metallic zinc anode contributes to system inefficiency. The rate of air injection is otherwise not critical once the minimum amount necessary to remove substantially all of the reactive oxygen from the catholyte fluid has been reached. The reaction between ambient oxygen and the metallic zinc anode will function to remove ambient oxygen over a wide range of air flowrates, from almost zero to complete consumption of the plated zinc from anode 48 in a matter of an hour or less of operation.

The oxygen-consuming reaction is very fast and provides high purity ambient nitrogen even at start-up ambient temperatures, provided that zinc is available at the anode. The reaction rate in most embodiments is linearly dependent on the air injection rate. In any case, at low states of charge the system is not very sensitive to the trace amounts of oxygen that are normally present at system start-up. The start-up time required for the nitrogen generation sub-system is not critical to the operation of this method.

The input to gas-liquid separation device 59 is anolyte fluid that is returning from anolyte chamber 46 to anolyte reservoir 54. According to certain embodiments, the anolyte fluid feed to gas-liquid separation device 59 contains a dissolved or entrained oxygen depleted gas phase that is mostly nitrogen in an anolyte liquid phase. The oxygen depleted gas phase is separated from the liquid anolyte phase. Gas-liquid separation device 59, in many embodiments is similar to gas-liquid separation device 21. According to certain embodiments this device includes a settling area, a cyclone, or a vented filter. The contents of lines 78 and 70, in most embodiments, consist of nothing but the oxygen depleted gas phase. The liquid anolyte phase flows through anolyte return overflow line 56 to anolyte reservoir 54. Where gas phase separation is not complete in gas-liquid separator device 59, the entrained gas phase tends to accumulate in headspace 62. In this way, there is in most embodiments at least a partial nitrogen blanket in headspace 54.

Injection line 78 delivers oxygen depleted ambient nitrogen to T-connection 76 through which it is delivered to manifold 70 for distribution to headspaces 36 and 62. Gas phase purge line 32 is slightly throttled to maintain a slight positive pressure (as compared to ambient) at headspace 36. The level of differential overpressure (as compared to ambient) varies between embodiments, but it should not be less than approximately 100 millibars to maintain oxygen exclusion from the ambient atmosphere.

Manifold 70 serves in part to equalize the pressure across cell separator 50. In certain embodiments there appears to be some incidental recovery of oxygen-depleted air in headspace 62 of anolyte reservoir 54 that is then sent to headspace 36 via manifold 70, but this is generally not necessary for the operation of the system.

Zinc recovery is accomplished by reducing the zinc metal that was consumed during the prior in situ nitrogen generation sub-operation. The reduced zinc metal plates out at the anode. The zinc recovery process is conducted periodically at the end of charge phase of the discharge-charge cycle (after all of the iron (III) is reduced). The iron side (catholyte side 38) of the cell is allowed to form oxygen gas at a potential greater than 2.2V, which is vented to atmosphere through oxygen purge line 23. This venting prevents the oxygen from contacting the catholyte fluid in catholyte reservoir 18, and the nitrogen blanket in headspace 36. Valve 27 is closed and valve 25 is opened to prevent the oxygen that is generated during this end of charge phase from entering catholyte reservoir 18.

Gas-liquid separator 21 serves to remove from the system at least most of the oxygen gas that evolves at the cathode 42 during the zinc regeneration sub-operation. Gas-liquid separator 21 is conventional, and consists of a settling area, and a cyclone. In additional embodiments, a vented filter may be employed. The control of this zinc regeneration sub-operation is based on charge voltage. When, during constant current charge, the onset of a high voltage period is detected, the evolved oxygen is allowed to vent to ambient by opening valve 25. The high voltage charge is allowed to continue until a second charge voltage plateau occurs where hydrogen evolution at the anode is initiated. The zinc is considered to be fully recovered when hydrogen evolution at the anode 48 commences.

According to certain alternative embodiments, an injection of an Fe(III) containing solution to the catholyte fluid, followed by additional charging, permits reduction of the excess zinc oxide without the evolution of oxygen at the cathode. The oxygen separation at 21 is a secondary process within the sub-operation to recover spent zinc. This secondary process is independent of the nitrogen purge in that there are alternatives to it. For example, chemical additions may be used to recover the zinc under conditions such that gassing at the iron electrode (cathode) does not occur. The oxygen out-gassing method of recovering zinc is a self-contained process that only requires occasional replacement of water, whereas the addition of chemicals, such as Fe(III), requires active monitoring and physical additions of solids or liquids, with the attendant complexities and potential for errors.

Gas phase purge line 32 (FIG. 2) contains any oxygen that is displaced from the Catholyte fluid in catholyte reservoir 18, as well as nitrogen carrier gas. The only oxygen leaving through line 23 is that which is evolved at the cathode 42 during the zinc recovery sub-operation.

The pressure in the headspaces 36 and 62 in the respective electrolyte reservoirs must be less than the pressure in manifold 70 (FIG. 2). Headspace 62 is a blanket. Most embodiments do not require gas flow in anode reservoir 54 in order to function. The pressure in manifold 70 is maintained higher than that in headspace 36 by purging this headspace to atmosphere through gas phase purge line 32. In certain embodiments, the pressure in ambient air injection line 72 is greater than that in anolyte fluid circulation conduit 58 (but not as high as the hydraulic head in anolyte reservoir 54). Anolyte fluid pump 60 increases this pressure to the level of the pressure in anolyte circulation conduit 61, which has a higher pressure than gas-liquid separation device 59. The pressure in gas-liquid separation device 59 is higher than in oxygen depleted gas phase injection line 78. The pressure in this line 78 is higher than that in manifold 70, and that in manifold 70 is higher than that in headspace 36. The pressure in headspace 36 is higher than in gas phase purge line 32, and this line 32 vents to atmosphere. According to certain alternative embodiments, ambient air can be injected through ambient air injection line 72 into anolyte fluid circulation conduit 61 at a higher pressure.

Except for the disclosed zinc recovery and nitrogen systems, the embodiments of FIGS. 1 and 2 are generally operated in a manner that is conventional for redox flow batteries with the same or similar chemistry.

Example 1

This bench experiment was devised to test the hypothesis that dissolved oxygen in catholyte fluid was causing the formation of undesired precipitates in the catholyte fluid, and that the undesired precipitates were primarily iron oxides. The results indicated that dissolved oxygen was reacting in the catholyte fluid to form undesired solid finely divided iron oxide precipitates in the catholyte fluid.

Two tests were run in parallel. The first test was fixtured to inject oxygen gas into an Erlenmeyer flask, and the second was fixtured to inject nitrogen gas into a similar flask. Each flask contained about 100 milliliters of 0.2 molar Fe(III) in 2 normal NaOH solution (simulated catholyte fluid). Both flasks were placed on hot plates set to hold the solutions at approximately 60 degrees Celsius. Both solutions were continuously stirred for 2 days (approximately 48 hours). At the end of the second day, the stirring and heating were discontinued. The solution in the flask that was under the oxygen atmosphere was noticeably darker than it was at the start of the experiment, and this solution contained paramagnetic, red, very finely divided precipitate that was mostly suspended in the solution. This precipitate was examined and found to be composed of solid particles having a sub-micron average size. The finely divided precipitate closely resembled the finely divided solid precipitate that had been previously observed in zinc-iron chemistry based redox flow batteries after as short an operating time as 8 hours. The solution in the flask that was under an atmosphere of nitrogen appeared to be unchanged in color, and there was no precipitate in it.

Example 2

This redox flow secondary battery system experiment was devised to test the same hypothesis that was bench tested in Example 1.

Two tests were run in series using the same zinc iron chemistry based redox flow battery system. The embodiment of this system that was used in these two tests is indicated diagrammatically in FIG. 1, except that there was no nitrogen source 28 or nitrogen feed line 30 used in the first test. In the second test, nitrogen was provided to the system as shown in FIG. 1. A pressure balancing manifold similar to that shown at 70 in FIG. 2 was also present in both tests extending between reservoirs 18 and 54 for the purpose of equalizing the pressure across the reaction cell 12. The system was substantially hermetically sealed, and a slight overpressure (slightly greater than ambient air pressure, approximately 100 millibars above ambient pressure) was maintained in the headspaces 36 and 62 of reservoirs 18 and 54, respectively, in an attempt to prevent ambient air from entering the system.

The redox flow secondary battery system was operated in the first test without nitrogen. The system was fully charged at the beginning of the first test, and was cycled through full discharge and back to full charge during the test. That is, one full discharge-charge operating cycle was performed. The system was shut down at the end of the charging phase of the cycle, and the system was examined. Traces of a finely divided solid red precipitate were observed suspended in the catholyte and embedded in cell separator 50. Previous operation of substantially the same system for several full discharge-charge cycles had resulted in the generation of so much solid finely divided precipitate that the cell separator 50 was fouled with it, and the reaction cell was operating very inefficiently. Some of the valves were clogged. In the second test, the redox flow secondary battery was operated with nitrogen sparging of the catholyte fluid in catholyte reservoir 18, and a nitrogen blanket in headspace 36, as shown in FIG. 1. After 10 full discharge-charge cycles there was no indication of any undesired precipitate in the catholyte fluid, or in the cell separator 50. Replacing the nitrogen source with an argon source will provide about the same results.

Replacing the nitrogen source 28 with in situ generated nitrogen as shown in FIG. 2 and described herein will provide the same results as operating with nitrogen supply 28 per FIG. 1.

Repeating the first test of Example 1 with zinc-cerium redox chemistry will result in the formation of an insoluble cerium oxide precipitate in only one full discharge-charge cycle. Repeating the second test of Example 1 with zinc-cerium chemistry will result in no evidence of a precipitate in the simulated catholyte fluid.

Changes and modifications may be made in the disclosed embodiments without departing from the spirit and scope of the accompanying claims. Many modifications and variations of the present invention are possible in light of the above teachings. It is therefore to be understood that, within the scope of the appended claims, the invention may be practiced otherwise than as specifically described and shown.

What is claimed is:

1. A process of operating a redox flow secondary battery system comprising:
    selecting a reaction cell with reactively confined anolyte fluid in an anolyte chamber and catholyte fluid in a catholyte chamber, said chambers being separated by a cell separator, and wherein;
    providing an anolyte reservoir in fluid transfer communication with said anolyte chamber through an anolyte fluid circulation circuit;
    providing a catholyte reservoir in fluid transfer communication with said catholyte chamber through a catholyte fluid circulation circuit; and
    introducing air containing ambient nitrogen and ambient oxygen into said anolyte fluid;
    causing said ambient oxygen to be removed from the air by a chemical reaction from said anolyte fluid in said anolyte chamber to form oxygen depleted air;
    bringing said oxygen depleted air into contact with said catholyte fluid; and
    allowing said oxygen depleted air to purge reactive oxygen from said catholyte fluid.

2. The process of claim 1 wherein the redox flow secondary battery system has a zinc-iron redox chemistry.

3. The process of claim 1 wherein catholyte fluid includes at least one element that forms a finely divided solid precipitate in the presence of reactive oxygen.

4. The process of claim 3 wherein the finely divided solid precipitate comprises iron oxide.

5. The process of claim 2 wherein ambient oxygen is removed from the air by reaction with zinc metal at an anode of the anolyte chamber.

* * * * *